2,770,648

PREPARATION OF HYDROXYBENZOIC ESTERS BY ALCOHOLYSIS

Jack Vair Schurman, New York, N. Y., assignor to Colgate-Palmolive Company, Jersey City, N. J., a corporation of Delaware No Drawing. Application January 13, 1953,
Serial No. 331,121

6 Claims. (Cl. 260—474)

The present invention relates to an improved method for preparing hydroxybenzoic esters in high purity and good yields and has particular reference to an improved alcoholysis process involving the reacting of esters of hydroxybenzoic acids and monohydric alcohols containing up to 4 carbon atoms with aliphatic alcohols having a boiling point of at least 150° C.

According to one known commercial procedure, such ester reaction products are prepared by a process known as "alcohol interchange" or "alcoholysis." Briefly stated such a procedure includes heating an ester of an alcohol and an hydroxybenzoic acid with a second alcohol, which second alcohol boils at a temperature higher than the first alcohol. The reaction is carried out in the presence of a suitable alkaline catalyst under conditions of temperature and pressure such that the first alcohol is distilled off from the reaction zone as it is formed leaving an ester of the second alcohol.

Using methyl salicylate as the ester starting material and dipropylene glycol as the higher boiling alcohol the reaction may be represented graphically as follows:

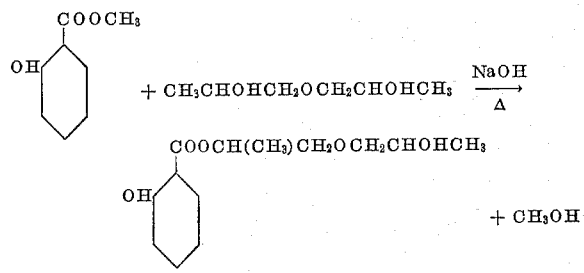

It has been found in the practice of such a process that the dipropylene glycol salicylate or other hydroxybenzoic ester reaction product produced and the materials removed in the distillate or overhead from the still both are contaminated with objectionable amounts of phenol.

The phenol must be removed from the ester reaction products since such products often are incorporated in lotions and like cosmetic preparations intended for direct application to the human skin. The overhead also must be treated to remove phenol before any portion of the overhead can be returned to the still for use in a subsequent run. The removal of phenol from the reaction product and the overhead requires the utilization of purification procedures and equipment which materially add to the cost of practicing the process.

It now has been discovered that the drawbacks and disadvantages inherent in the above described process can be overcome or substantially minimized by carrying out the alcoholysis reaction described in the presence of an inert gas. Briefly, the improved process comprises reacting an ester of an hydroxybenzoic acid and a monohydric alcohol containing up to 4 carbon atoms with an aliphatic alcohol having a boiling point of at least 150° C., in the presence of an alkaline catalyst and an inert gas.

In carrying out the process the starting materials preferably are placed in a reaction vessel provided with means for agitating the contents. Examples of suitable ester starting materials include methyl salicylate, ethyl salicylate, butyl salicylate, methyl parahydroxy benzoate, ethyl cresotate, isopropyl vanillate, and other esters of hydroxybenzoic acids and monohydric alcohols having up to 4 carbon atoms.

The alcohols reacted with the above described ester starting materials in accordance with the process of this invention are aliphatic alcohols having a boiling point of at least 150° C. and include glycerine, dipropylene glycol, stearyl alcohol, capryl alcohol, ethylene glycol, propylene glycol and the like.

Alkaline catalytic materials suitable for use in accordance with this invention include oxides, hydroxides, and weak acid salts of the alkali metals and the alkaline earth metals as well as the alkali metals and alkaline earth metals per se. More particularly, representative examples of materials suitable for use as catalysts in the present process include sodium hydroxide, potassium hydroxide, sodium carbonate, sodium salicylate, metallic lithium, barium oxide, calcium acetate, and the like. The catalytic materials may be employed in any suitable form, i. e., as a solid, in the form of an aqueous solution, or as a solution in an alcohol or other suitable solvent.

After the ester starting material, the aliphatic alcohol having a boiling point of at least 150° C., and the catalyst have been placed in the reaction vessel the materials are agitated and heated to a suitable temperature for a period of about 10 hours. An inert gas is introduced into the vessel throughout the entire heating operation.

The inert gas employed preferably is carbon dioxide. While other inert gases such as nitrogen may be employed the use of carbon dioxide is preferred since it has been found to be particularly effective in preventing phenol formation.

The mechanism by which carbon dioxide exercises this specificity of action is not understood fully at this time. However, the following table gives comparative test data which demonstrate the superiority of carbon dioxide, as compared with nitrogen, in preventing phenol formation. In the table, run No. 1 was not carried out in accordance with the process of this invention, i. e., the run was carried out in the absence of inert gas. Runs Nos. 2–4 were carried out in accordance with the process of this invention. In each of the four runs, an initial charge of about 305 grams of methyl salicylate, about 297 grams of dipropylene glycol, and about 8 grams of sodium salicylate catalyst (50% aqueous solution) was used. In each run, the materials were heated to a temperature within the range of about 200° to 235° C. for a period of about 10 hours. The data set forth in the column headed "Grams Phenol Formed" were obtained by fractional distillation under vacuum of the distillates of the respective runs.

TABLE

| Run No. | Inert Gas Used | Grams Phenol Formed |
|---|---|---|
| 1 | None | 29.0 |
| 2 | Carbon Dioxide introduced under atmospheric pressure. | 16.8 |
| 3 | Carbon Dioxide introduced under a pressure of 2 pounds per square inch (gauge). | 4.5 |
| 4 | Nitrogen introduced under a pressure of 2 pounds per square inch (gauge). | 16.5 |

In practicing the process of this invention a substantial excess of the aliphatic alcohol having a boiling point of at least 150° C. may be used. However, it is an important feature of this invention that satisfactory results may be obtained by using only about 1.05 mols of such an alcohol for each mol of ester starting material employed. In general, such alcohols may be used in amounts within the range of about 1.05 to about 1.5 mols for each mol of the ester starting material. If desired, however, a much greater molar excess of the alcohol may be used since any unreacted alcohol present upon completion of the process can be recovered for re-use in a subsequent run.

The temperature at which the process is carried out likewise may be varied within certain limits. Generally, the rate of reaction and the yield are effected favorably when temperatures within the range of about 200° C. to about 250° C. are employed.

The amount of catalyst employed depends somewhat upon operating conditions. Generally about 0.005 to about 0.050 mol of catalyst per mol of ester starting material have been found to be effective.

While the inert gas may be introduced into the reaction mixture simply by bubbling the same under low pressure it is preferred that the gas be introduced under a pressure of at least one pound per square inch (gauge), and preferably at a pressure within the range of about 2 to about 10 pounds per square inch (gauge).

To illustrate more fully the improved process of the present invention the following examples are set forth. The examples are presented for illustrative purposes only and are not intended to limit the scope of the invention in any manner. The parts given are by weight unless otherwise indicated.

*Example I*

About 305 parts of U. S. P. methyl salicylate, about 297 parts of dipropylene glycol and about 4 parts of sodium hydroxide are placed in the reaction vessel of a distillation apparatus. The mixture is stirred and heated gradually to a temperature of about 200° to 235° C. and maintained at that temperature for a period of about 10 hours. A steady stream of gaseous carbon dioxide is passed into the reaction mixture throughout the entire reaction under a pressure of about 2 pounds per square inch (gauge). The mixture then is distilled under vacuum for an additional 30 minutes to distill off any unreacted methyl salicylate and dipropylene glycol. The diopropylene glycol salicylate product remaining in the reaction vessel and the distillate together contain about 4 parts of phenol, indicating that only about 2% of the methyl salicylate introduced into the reaction has been converted to phenol. The vacuum distillate contains only about 4% phenol.

In a similar operation, with the exception that carbon dioxide is not passed into the reaction mixture, the dipropylene glycol salicylate product remaining in the reaction vessel and the distillate together are contaminated with about 30 parts of phenol, indicating that about 16% of the methyl salicylate introduced into the reaction has been converted to phenol. The vacuum distillate in this instance contains about 31% phenol.

*Example II*

In a commercial operation a 7500 pound still is charged with about 3320 pounds of ethyl salicylate, about 2024 pounds of glycerine and about 16 pounds of sodium salicylate dissolved in about 16 pounds of methyl alcohol (99%). A stream of carbon dioxide is passed into the mixture through a delivery pipe, the end of which opens beneath the level of the reactants in the still. The carbon dioxide is introduced into the mixture throughout the entire reaction under a pressure of about 5 pounds per square inch (gauge).

The mixture is stirred and heated to a temperature within the range of about 200° to 250° C. The mixture is maintained at this temperature with stirring until the distillation of ethyl alcohol ceases. The mixture then is distilled under vacuum for about an additional 30 minutes whereupon any unreacted ethyl salicylate and glycerine distill off.

The substantially pure glyceryl salicylate product remaining in the still is withdrawn. The overhead, comprising glycerine and ethyl salicylate, is free from phenol and may be returned advantageously to the still for utilization in a subsequent run.

In accordance with the process of the present invention the alcoholysis reaction may be carried out batchwise in suitable vessels provided with means for stirring and heating the reacting materials, or continuously, using proportioning devices to regulate the rates of flow of materials into the system.

The ester reaction products of this invention are useful as the sunscreen ingredient in anti-sunburn preparations. They serve to protect the skin not only from sunburn but also from infection due to their antiseptic properties. In addition they have a further advantage, viz., that of alleviating the pain resulting from sunburn so that they may be used advantageously in treating skin which has been sunburned as well as in protecting the skin from sunburn.

While there has been disclosed and described what is at present considered to be the preferred embodiment of the invention, it will be understood, of course, that many modifications, substitutions, changes and the like may be made therein without departing from the true scope of the invention as defined in the appended claims.

Having described the invention, what is claimed is:

1. An alcohol exchange process for the preparation of a higher ester of an o-hydroxybenzoic acid substantially free of phenol which comprises forming a mixture of a low boiling ester of an o-hydroxybenzoic acid and a monohydric alcohol having up to 4 carbon atoms, an aliphatic alcohol having a boiling point of at least 150° C., and an alkaline catalyst, heating said mixture to a temperature sufficient to cause alcohol exchange and to distill said monohydric alcohol out of said mixture, conducting said heating in the presence of an inert gas from the group consisting of nitrogen and carbon dioxide to inhibit formation of phenol, thereby forming a higher boiling ester of said o-hydroxybenzoic acid and aliphatic alcohol substantially free of phenol.

2. An alcohol exchange process for the preparation of a higher ester of an o-hydroxybenzoic acid substantially free of phenol which comprises forming a mixture of a low boiling ester of an o-hydroxybenzoic acid and a monohydric alcohol having up to 4 carbon atoms, an aliphatic alcohol having a boiling point of at least 150° C., and an alkaline catalyst, and continuously supplying said mixture with gaseous carbon dioxide to inhibit formation of phenol while heating said mixture to a temperature sufficient to cause alcohol exchange and to distill said monohydric alcohol out of said mixture, thereby forming a higher boiling ester of said o-hydroxybenzoic acid and an aliphatic alcohol substantially free of phenol.

3. An alcohol exchange process for the preparation of a higher ester of an o-hydroxybenzoic acid substantially free of phenol which comprises forming a mixture of a low boiling ester of an o-hydroxybenzoic acid and a monohydric alcohol having up to 4 carbon atoms, an aliphatic alcohol having a boiling point of at least 150° C., and an alkaline catalyst, and continuously supplying said mixture with gaseous carbon dioxide at a gauge pressure of 0 to 10 pounds per square inch to inhibit formation of phenol while heating said mixture to a temperature of 200 to 250° C. to distill said monohydric alcohol out of said mixture, thereby forming a higher boiling ester of said o-hydroxybenzoic acid and aliphatic alcohol substantially free of phenol.

4. An alcohol exchange process for the preparation of a higher ester of an o-hydroxybenzoic acid substantially free of phenol which comprises forming a mixture of a low boiling ester of an o-hydroxybenzoic acid and a monohydric alcohol having up to 4 carbon atoms, dipropylene glycol, and an alkaline catalyst, and heating said mixture, in the presence of carbon dioxide to inhibit formation of phenol, to a temperature sufficent to cause alcohol exchange and to distill said monohydric alcohol out of said mixture, thereby forming a dipropylene glycol ester of said o-hydroxybenzoic acid substantially free of phenol.

5. An alcohol exchange process for the preparation of a higher ester of an o-hydroxybenzoic acid substantially free of phenol which comprises forming a mixture of a low boiling ester of an o-hydroxybenzoic acid and a monohydric alcohol having up to 4 carbon atoms, glycerine, and an alkaline catalyst, and heating said mixture, in the presence of carbon dioxide to inhibit formation of phenol, to a temperature sufficient to cause alcohol exchange and to distill said monohydric alcohol out of said mixture, thereby forming a glycerine ester of said o-hydroxybenzoic acid substantially free of phenol.

6. An alcohol exchange process for the preparation of a higher ester of salicylic acid substantially free of phenol which comprises forming a mixture of methyl salicylate, and an aliphatic alcohol having a boiling point of at least 150° C., and an alkaline catalyst, and heating said mixture, in the presence of carbon dioxide to inhibit formation of phenol, to a temperature sufficient to cause alcohol exchange and to distill methanol out of said mixture, thereby forming a higher boiling ester of salicylic acid and said aliphatic alcohol substantially free of phenol.

References Cited in the file of this patent

UNITED STATES PATENTS 2,380,563     Wayo et al. _____ July 31, 1945